United States Patent
Johnson et al.

(10) Patent No.: US 9,676,464 B2
(45) Date of Patent: Jun. 13, 2017

(54) STABILIZED DIRECTIONAL CONTROL SYSTEMS AND METHODS

(71) Applicant: FLIR Systems, Inc., Wilsonville, OR (US)

(72) Inventors: Mark Johnson, Vannes (FR); Chris Yeomans, Portsmouth (GB)

(73) Assignee: FLIR Systems, Inc., Wilsonville, OR (US)

( * ) Notice: Subject to any disclaimer, the term of this patent is extended or adjusted under 35 U.S.C. 154(b) by 0 days.

(21) Appl. No.: 14/321,646

(22) Filed: Jul. 1, 2014

(65) Prior Publication Data

US 2014/0316657 A1 Oct. 23, 2014

Related U.S. Application Data

(63) Continuation of application No. PCT/US2014/013441, filed on Jan. 28, 2014.

(60) Provisional application No. 61/759,238, filed on Jan. 31, 2013.

(51) Int. Cl.

| | |
|---|---|
| *A01B 69/00* | (2006.01) |
| *B62D 6/00* | (2006.01) |
| *B62D 11/00* | (2006.01) |
| *B62D 12/00* | (2006.01) |
| *B63G 8/20* | (2006.01) |
| *B63H 25/04* | (2006.01) |
| *G05D 1/00* | (2006.01) |
| *G06F 7/00* | (2006.01) |
| *G06F 17/00* | (2006.01) |
| *B63H 25/06* | (2006.01) |
| *G05D 1/02* | (2006.01) |

(52) U.S. Cl.
CPC ........... *B63H 25/06* (2013.01); *G05D 1/0206* (2013.01)

(58) Field of Classification Search
CPC .............................. B63H 25/06; G05D 1/0206
USPC .......................................................... 701/42
See application file for complete search history.

(56) References Cited

U.S. PATENT DOCUMENTS

| | | | |
|---|---|---|---|
| 2009/0171520 A1* | 7/2009 | Kaji | 701/21 |
| 2010/0228420 A1* | 9/2010 | Lee | 701/26 |
| 2011/0046843 A1 | 2/2011 | Caveney | |

FOREIGN PATENT DOCUMENTS

EP 2 096 018 9/2009

* cited by examiner

*Primary Examiner* — Maceeh Anwari
(74) *Attorney, Agent, or Firm* — Haynes and Boone, LLP

(57) ABSTRACT

Techniques are disclosed for systems and methods to provide stabilized directional control for a vehicle. A directional control system for an embodiment may include a logic device adapted to receive directional data about a vehicle and determine nominal vehicle feedback from the directional data. The nominal vehicle feedback may be used to adjust a directional control signal provided to an actuator of a vehicle. The directional control signal may be limited to a value below an actuator rate limit before a directional control signal is adjusted by the nominal vehicle feedback. A directional control system may include a logic device, a memory, one or more sensors, one or more actuators/controllers, and modules to interface with users, sensors, actuators, and/or other modules of a vehicle.

22 Claims, 4 Drawing Sheets

2

STABILIZED DIRECTIONAL CONTROL SYSTEMS AND METHODS

CROSS-REFERENCE TO RELATED APPLICATIONS

This application is a continuation of International Patent Application No. PCT/US2014/13441 filed Jan. 28, 2014 and entitled "STABILIZED DIRECTIONAL CONTROL SYSTEMS AND METHODS," which is incorporated herein by reference in its entirety.

International Patent Application No. PCT/US2014/13441 claims the benefit of U.S. Provisional Patent Application No. 61/759,238 filed Jan. 31, 2013 and entitled "STABILIZED DIRECTIONAL CONTROL SYSTEMS AND METHODS," which is incorporated herein by reference in its entirety.

TECHNICAL FIELD

One or more embodiments of the invention relate generally to directional control and more particularly, for example, to systems and methods for stabilized directional control for vehicles.

BACKGROUND

Directional control systems and methods are used to provide automated and/or supplemented control for planes, watercraft, and, more recently, automobiles. A significant drawback to conventional directional control systems is that they typically need to be designed and/or configured for a particular vehicle, and once configured, cannot easily be used to provide directional control for a different vehicle. Thus, manufacturing directional control systems and methods for a number of different vehicles, even if they are of the same type, such as different makes of ships, can be expensive due to extensive testing and adjustment procedures performed for each individual vehicle.

Adaptive control techniques have been developed to address manually performing the adjustment and testing procedures, but conventional adaptive techniques typically take too long to train to a particular vehicle dynamic under normal operating conditions. Furthermore, conventional adaptive techniques typically train to a very limited set of vehicle states and or dynamics, and directional controllers based on these techniques are known to drastically lose their accuracy and/or stability as conditions vary even subtly outside previous training conditions. Thus, there is a need for improved directional control methodologies.

SUMMARY

Techniques are disclosed for systems and methods to provide stabilized directional control for a vehicle. In accordance with one or more embodiments, a directional control system may include a logic device adapted to receive directional data about a vehicle and determine nominal vehicle feedback from the directional data. The nominal vehicle feedback may be used to adjust a directional control signal provided to an actuator of a vehicle. The directional control signal may be limited to a value below an actuator rate limit before a directional control signal is adjusted by the nominal vehicle feedback. In accordance with an embodiment, a directional control system may include a logic device, a memory, one or more sensors, one or more actuators/controllers, and modules to interface with users, sensors, actuators, and/or other modules of a vehicle.

In another embodiment, a system includes a logic device configured to receive one or more sensor signals and generate one or more controller signals to provide directional control for a vehicle. The logic device may be adapted to receive a steering angle and a steering rate of the vehicle, wherein the steering angle is based, at least in part, on a steering demand, determine a nominal vehicle steering rate based, at least in part, on the steering angle, and determine a nominal vehicle feedback signal based, at least in part, on a combination of the nominal vehicle steering rate and the steering rate. In one embodiment, the nominal vehicle feedback signal may be provided and/or adapted to adjust the steering demand.

In another embodiment, a method includes receiving a steering angle and a steering rate of a vehicle, wherein the steering angle is based, at least in part, on a steering demand, determining a nominal vehicle steering rate based, at least in part, on the steering angle, and determining a nominal vehicle feedback signal based, at least in part, on a combination of the nominal vehicle steering rate and the steering rate. In one embodiment, the nominal vehicle feedback signal may be provided and/or adapted to adjust the steering demand.

In a further embodiment, a non-transitory machine-readable medium includes a plurality of machine-readable instructions which when executed by one or more logic devices of a system are adapted to cause the system to perform a method. The method may include receiving a steering angle and a steering rate of a vehicle, wherein the steering angle is based, at least in part, on a steering demand, determining a nominal vehicle steering rate based, at least in part, on the steering angle, and determining a nominal vehicle feedback signal based, at least in part, on a combination of the nominal vehicle steering rate and the steering rate. In one embodiment, the nominal vehicle feedback signal may be provided and/or adapted to adjust the steering demand The scope of the invention is defined by the claims, which are incorporated into this section by reference. A more complete understanding of embodiments of the invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

Embodiments of the invention and their advantages are best understood by referring to the detailed description that follows. It should be appreciated that like reference numerals are used to identify like elements illustrated in one or more of the figures.

DETAILED DESCRIPTION

In accordance with various embodiments of the present disclosure, directional control systems and methods may advantageously include a nominal vehicle feedback system to modify vehicle dynamics sensed and/or acted upon by a controller. For example, a nominal vehicle feedback system can be used as a buffer between a controller and actual/measured vehicle dynamics. In some embodiments, the nominal vehicle feedback system can be configured to translate control signals of the controller to match and/or accurately compensate for the actual dynamics of the particular vehicle. In such embodiments, the controller can be configured to adequately control a known nominal vehicle, for example, and the overall directional control system including a nominal vehicle feedback system can adequately control an actual vehicle, regardless of the actual and/or potentially changing dynamics of the actual vehicle.

In some embodiments, a known nominal vehicle can be represented by a nominal vehicle model (e.g., a predictor) executed/operating within the nominal vehicle feedback system. In accordance with embodiments disclosed herein, a predictor may be derived from a selection of vehicles, for example, that may be of a type similar to the vehicle to be controlled. In various embodiments, a nominal vehicle feedback system including a predictor can be configured to adaptively train to a variety of different vehicles and/or a vehicle with changing and/or complex dynamics in a relatively short period of time. In one embodiment, a nominal vehicle feedback system can be configured to adaptively train to a changing vehicle dynamic in a time period shorter than a time needed to complete a particular directional control maneuver, such as a heading change.

Thus, a single directional control system including a nominal vehicle feedback system may be used to adequately control a single vehicle with changing and/or complex dynamics (e.g., due to damage and/or environmental disturbances), or a relatively large number of different vehicles each with particularized vehicle dynamics. Therefore, embodiments of the present disclosure can provide directional control systems and methods that can be implemented for a number of different vehicles in a cost effective and time efficient manner.

Figure 1:
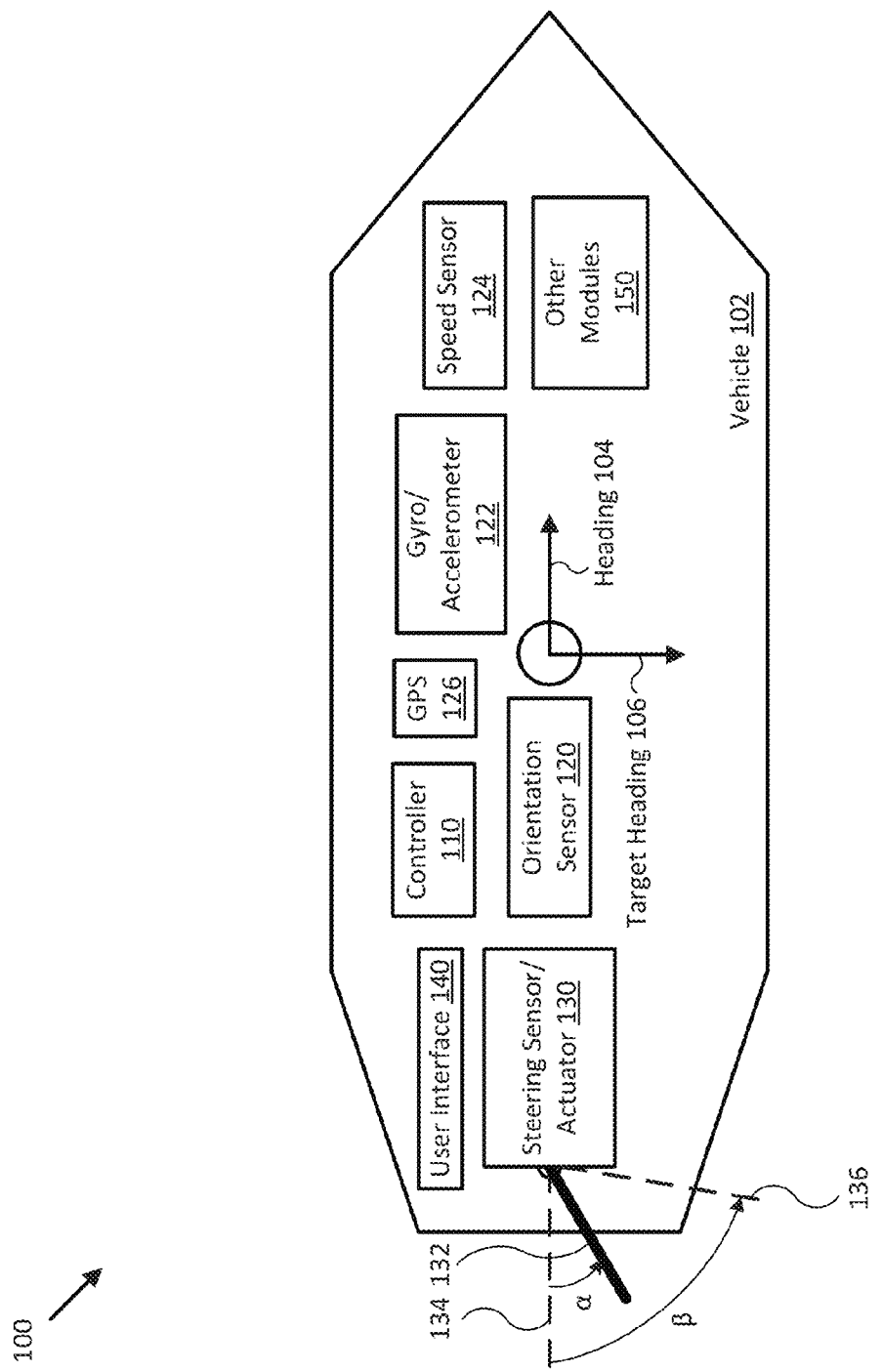
FIG. 1 illustrates a block diagram of a directional control system in accordance with an embodiment of the disclosure.

FIG. 1 illustrates a block diagram of a directional control system 100 in accordance with an embodiment of the disclosure. In the embodiment shown in FIG. 1, system 100 may be implemented to provide directional control for a particular type of vehicle 102. For example, types of vehicles may include types of planes, automobiles, and/or watercraft (e.g., sailboat, powerboat, ship, submarine, or other vessel able to operate in or on water). Directional control of a vehicle may refer to control of any one or combination of yaw, pitch, or roll of a vehicle.

In one embodiment, system 100 may include a controller 110, one or more sensors and user interfaces providing input to controller 110, and one or more actuators accepting control signals from controller 110. For example, system 100 may include an orientation sensor 120, a gyroscope and/or accelerometer 122, a speed sensor 124, a GPS 126, a steering sensor and/or actuator 130, a user interface 140, and/or various other sensors and/or actuators used to sense and/or control a state of vehicle 102. In a further embodiment, one or more of controller 110, sensors 120-126, sensor and/or actuator 130, user interface 140, and/or various other sensors and/or actuators may be fixed relative to vehicle 102.

In some embodiments, controller 110, sensors 120-126, steering sensor/actuator 130, and/or user interface 140 may be adapted to communicate with each other through a variety of wireless and/or wired connections, for example, such as WiFi, Bluetooth, Ethernet, or other wireless and/or wired connections. In other embodiments, one or more of controller 110, sensors 120-126, steering sensor/actuator 130, and/or user interface 140 may be integrated into a single device, where communication between integrated sensors, controllers, actuators, and/or user interfaces may happen entirely within the single integrated device.

Controller 110 may be implemented as any appropriate logic device (e.g., processing device, microcontroller, processor, application specific integrated circuit (ASIC), field programmable gate array (FPGA), memory storage device, memory reader, or other device or combinations of devices) that may be adapted to execute, store, and/or receive appropriate instructions, such as, for example, software instructions implementing a control loop for providing stabilized directional control, as described herein. In addition, a machine readable medium may be provided for storing non-transitory instructions for loading into and execution by controller 110. In these and other embodiments, controller 110 may be implemented with other components where appropriate, such as volatile memory, non-volatile memory, and/or one or more interfaces (e.g., inter-integrated circuit (I2C) interfaces, mobile industry processor interfaces (MIPI), joint test action group (JTAG) interfaces (e.g., IEEE 1149.1 standard test access port and boundary-scan architecture), and/or other interfaces). For example, one or more modules of a control loop executed by controller 110 may be implemented as a physical component or group of components electrically coupled to the remainder of controller 110.

In some embodiments, controller 110 may include one or more sensor inputs for receiving sensor signals corresponding to a state of vehicle 102 and/or user input from user interface 140. In further embodiments, controller may include one or more controller outputs for providing controller signals to actuators of vehicle 102. For example, controller 110 may be adapted to receive a measured heading 104 of vehicle 102 from orientation sensor 120, a measured steering rate (e.g., a measured yaw rate, in some embodiments) from gyroscope/accelerometer 122, a measured speed from speed sensor 124, a measured position or series of absolute and/or relative positions from GPS 126, a measured steering angle from steering sensor/actuator 130, and/or a user input from user interface 140. In some embodiments, a user input may include a target heading 106, for example, an absolute position and/or waypoint (e.g., from which target heading 106 may be derived), and/or one or more other control loop parameters. In further embodiments, controller 110 may be adapted to determine a steering demand based on one or more of the received sensor signals, including the user input, and provide the steering demand to steering sensor/actuator 130.

As noted herein, controller 110 may be adapted to execute one or more control loops according to a variety of control loop parameters described herein. In some embodiments, a control loop may include a nominal vehicle predictor used to produce a feedback signal corresponding to an average or nominal vehicle rather than to vehicle 102. Such feedback signal may be used to adjust or correct control signals from a proportional, proportional-derivative, and/or proportional-derivative-integral controller module (e.g., implemented as a portion of controller 110) also forming a portion of the control loop, as described herein. In some embodiments, a control loop may include one or more vehicle dynamics modules corresponding to actual vehicles, for example, that may be used to implement an adaptive algorithm for training various control loop parameters, such as parameters for a nominal vehicle predictor, without necessitating real-time control of an actual vehicle.

Steering sensor/actuator 130 may be adapted to sense and/or physically adjust a steering mechanism for vehicle 102 according to one or more control signals (e.g., a steering demand) provided by controller 110. A steering mechanism may be implemented as one or more rudders (e.g., an airplane rudder, or a watercraft rudder), elevators, ailerons, automobile steering mechanisms, or other steering mechanisms physically coupled to a vehicle and able to effect a change in one or more of a yaw, pitch, or roll of the vehicle, for example.

In some embodiments, rudder 132 (e.g., a steering mechanism) may be implemented as one or more control surfaces and/or conventional rudders, one or more directional propellers and/or vector thrusters (e.g., directional water jets), a system of fixed propellers and/or thrusters that can be powered at different levels and/or reversed to effect a steering rate of vehicle 102, and/or other types or combination of types of steering mechanisms appropriate for vehicle 102. In embodiments where rudder 132 is implemented, at least in part, as a system of fixed propellers and/or thrusters, steering angle α may represent an effective and/or expected steering angle based on, for example, characteristics of vehicle 102, the system of fixed propellers and/or thrusters (e.g., their position on vehicle 102), and/or control signals provided to steering sensor/actuator 130. An effective and/or expected steering angle α may be determined by controller 110 according to a pre-determined algorithm, for example, or through use of an adaptive algorithm for training various control loop parameters characterizing the relationship of steering angle α to, for instance, power levels provided to the system of fixed propellers and/or thrusters and/or control signals provided by controller 110, as described herein.

As shown in FIG. 1, steering sensor/actuator 130 may be physically coupled to rudder 132, for example, and be adapted to physically adjust rudder 132 to a variety of positive and/or negative steering angles, such as a positive steering angle α measured relative to a zero steering angle direction (e.g., designated by a dashed line 134). In various embodiments, steering sensor/actuator 130 may be implemented with a steering actuator angle limit (e.g., the positive limit is designated by an angle β and a dashed line 136 in FIG. 1), and/or a steering actuator rate limit "R". For example, a steering actuator rate limit may be a limit of how quickly steering sensor/actuator 130 can change a steering angle of a steering mechanism (e.g., rudder 132), and, in some embodiments, such steering actuator rate limit may vary depending on a speed of vehicle 102 along vehicle heading 104 (e.g., a speed of a ship relative to surrounding water, or of a plane relative to a surrounding air mass).

In further embodiments, a steering actuator rate limit may vary depending on whether steering sensor/actuator 130 is turning with (e.g., an increased steering actuator rate limit) or turning against (e.g., a decreased steering actuator rate limit) a prevailing counteracting force, such as a prevailing current (e.g., a water and/or air current). A prevailing current may be determined from sensor signals provided by orientation sensor 120, gyroscope/accelerometer 122, speed sensor 124, and/or GPS 126, for example.

In various embodiments, steering sensor/actuator 130 may be implemented as a number of separate sensors and/or actuators, for example, to sense and/or control a one or more steering mechanisms substantially simultaneously, such as one or more rudders, elevators, and/or automobile steering mechanisms, for example. In some embodiments, steering sensor/actuator 130 may include one or more sensors and/or actuators adapted to sense and/or adjust a propulsion force (e.g., a propeller speed and/or an engine rpm) of vehicle 102, for example, to effect a particular directional control maneuver (e.g., to meet a particular steering demand within a particular period of time), for instance, or to provide a safety measure (e.g., an engine cut-off and/or reduction in vehicle speed).

Orientation sensor 120 may be implemented as an electronic compass, sextant, or other device capable of measuring heading 104 and/or other orientation states of vehicle 102 and providing such measurements as sensor signals to controller 110. In some embodiments, orientation sensor 120 may be adapted to determine absolute and/or relative pitch, roll, and/or yaw of vehicle 102, for example, and, through periodic measurements, pitch rate, roll rate, and/or yaw rate of vehicle 102. Thus, orientation sensor 120 may be adapted to provide a measured heading and/or a measured steering rate for vehicle 102.

In other embodiments, orientation sensor 120 may be configured to determine pitch, pitch rate, roll, and/or roll rate prior to determining yaw and/or yaw rate to reduce pitch-induced noise in the determined yaw rate. In such embodiments, the later-determined yaw rate may be referred to as a compensated yaw rate. In some embodiments, orientation sensor 120 may provide pitch, pitch rate, roll, roll rate, yaw, and/or yaw rate to controller 110 and controller 110 may be adapted to determine a compensated yaw rate based on the provided sensor signals. In various embodiments, a yaw rate and/or compensated yaw rate may be approximately equal to a steering rate of vehicle 102.

Gyroscope and/or accelerometer 122 may be implemented as one or more gyroscopes, accelerometers, and/or other devices capable of measuring rotational and/or linear accelerations of vehicle 102 and providing such measurements as sensor signals to controller 110. In some embodiments, gyroscope and/or accelerometer 122 may be adapted to determine pitch, pitch rate, roll, roll rate, yaw, yaw rate, compensated yaw rate, an absolute speed, and/or a linear acceleration rate of vehicle 102. Thus, gyroscope and/or accelerometer 122 may be adapted to provide a measured heading, a measured steering rate, and/or a measured speed for vehicle 102. In some embodiments, gyroscope and/or accelerometer 122 may provide pitch rate, roll rate, yaw rate, and/or a linear acceleration of vehicle 102 to controller 110 and controller 110 may be adapted to determine a compensated yaw rate based on the provided sensor signals. In various embodiments, a yaw rate and/or compensated yaw rate may be approximately equal to a steering rate of vehicle 102.

Speed sensor 124 may be implemented as an electronic pitot tube and/or other device capable of measuring one or more linear speeds of vehicle 102 and providing such measurements as sensor signals to controller 110. In some embodiments, speed sensor 124 may be adapted to determine a speed of vehicle 102 along heading 104 relative to a local air mass and/or a local water current. In further embodiments, speed sensor 124 may be adapted to determine multiple such measurements, such as in different directions relative to heading 104.

GPS 126 may be implemented as a global positioning satellite receiver and/or other device capable of determining absolute and/or relative position of vehicle 102 based on wireless signals received from space-born and/or terrestrial sources, for example, and capable of providing such measurements as sensor signals to controller 110. In some embodiments, GPS 126 may be adapted to determine an absolute speed of vehicle 102 (e.g., using a series of position measurements) along heading 104 and/or along different directions relative to heading 104. In other embodiments, GPS 126 may be adapted to determine a heading and/or a steering rate of vehicle 102.

User interface 140 may be implemented as a display, a touch screen, a keyboard, a mouse, a joystick, a knob, a steering wheel, a ship's wheel, a yolk, or any other device capable of accepting user input and/or providing feedback to a user, and providing the user input (e.g., as a type of sensor input) to controller 110. In one embodiment, user interface 140 may be adapted to accept a user input corresponding to target heading 106, for example, and/or a waypoint for a particular course. In other embodiments, user interface 140 may be adapted to accept user input modifying a control loop parameter of controller 110, for example, or selecting a responsiveness of controller 110 in controlling a direction (e.g., through application of a particular steering angle) of vehicle 102.

For example, a responsiveness setting may include selections of Performance (e.g., fast response), Cruising (medium response), and Economy (slow response) responsiveness, where the different settings are used to choose between a more pronounced and immediate steering response (e.g., a faster control loop response) or reduced steering actuator activity (e.g., a slower control loop response). In some embodiments, a responsiveness setting may correspond to a maximum desired lateral acceleration during a turn. In such embodiments, the responsiveness setting may modify a gain, a deadband, a limit on an output, a bandwidth of a filter, and/or other control loop parameters of controller 110, as described herein.

Other modules 150 may include other and/or additional sensors, actuators, communications modules, and/or user interface devices used to facilitate directional control of vehicle 102, for example. In some embodiments, other modules 150 may include a depth sensor, a humidity sensor, a temperature sensor, an obstruction sensor, a radar system, a visible spectrum camera, an infrared camera, and/or other environmental sensors providing measurements and/or other sensor signals that can be used by controller 110 to provide directional control that compensates for environmental conditions, such as water density, for example, or an object in a path of vehicle 102.

Figure 2:
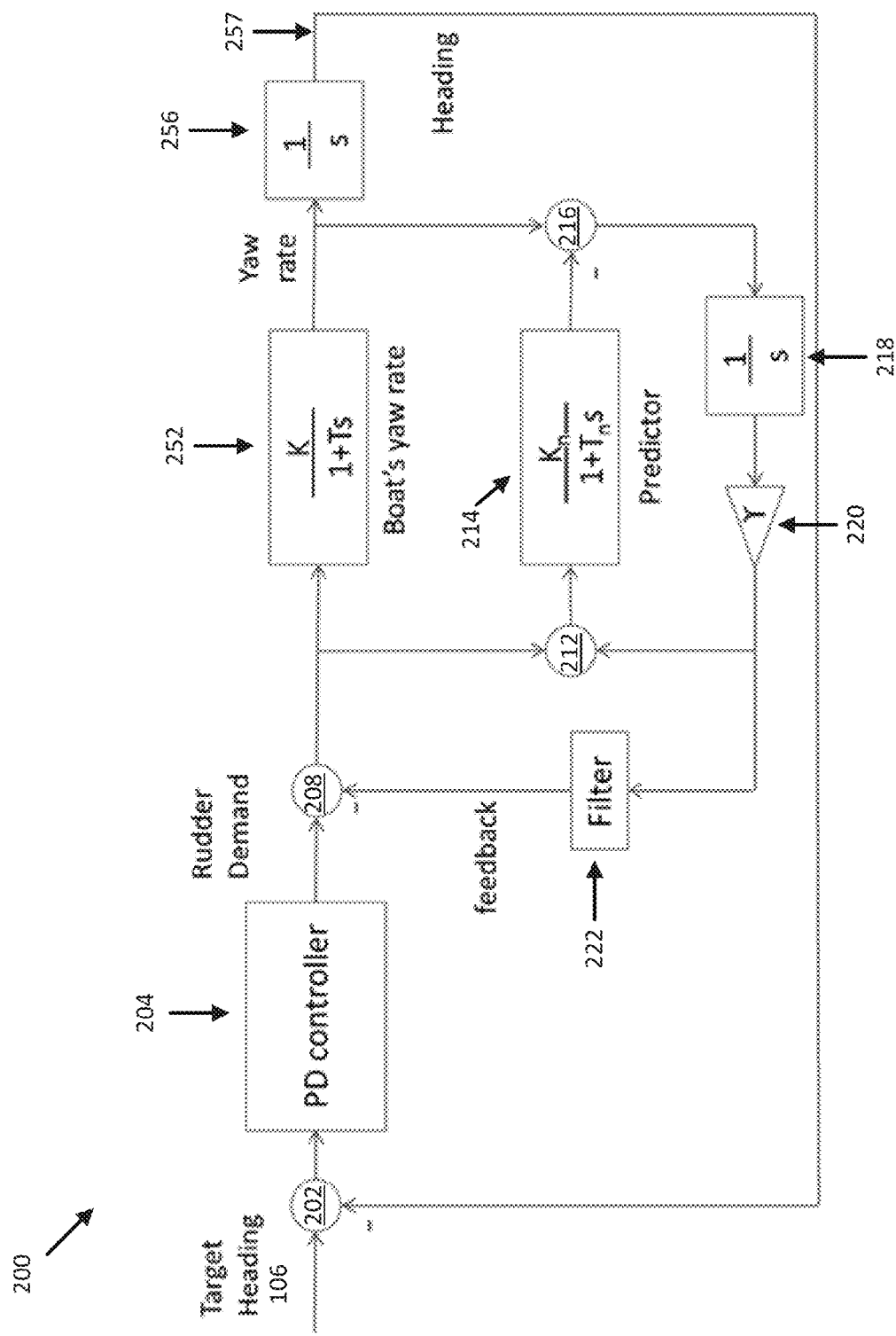
FIG. 2 illustrates a flow diagram of a control loop to provide stabilized directional control in accordance with an embodiment of the disclosure.

FIG. 2 illustrates a flow diagram of a control loop 200 to provide stabilized directional control for vehicle 102 in accordance with an embodiment of the disclosure. In some embodiments, the operations of FIG. 2 may be performed by controller 110 processing and/or operating on signals received from one or more of sensors 120-126, steering sensor/actuator 130, user interface 140, and/or other modules 150. In accordance with an embodiment, each block may be implemented entirely as instructions executed by controller 110, for example, or may be implemented in a combination of executable instructions and hardware, such as one or more inductors, capacitors, resistors, digital signal processors, and other analog and/or digital electronic devices. It should be appreciated that any step, sub-step, sub-process, or block of control loop 200 may be performed in an order or arrangement different from the embodiment illustrated by FIG. 2. For example, although control loop 200 includes block 252, in other embodiments, block 252 may not be present, for example, and/or may be replaced with one or more sensors providing measured data.

As shown in FIG. 2, block 252 of control loop 200 includes a vehicle dynamics module that may be implemented as a transfer function (e.g., in the S-plane) in the form of a ratio of a steering rate gain term "K" (e.g., a forward gain of a vehicle) to a steering rate lag term "1+T*s". For example, the steering rate gain term "K" may be equal to the ratio (steering rate)/(steering angle), which models the amount of steering rate (e.g., yaw rate) achieved for a particular vehicle for each degree of steering angle (e.g., rudder angle). The steering rate gain term "K" can be corrected by the steering rate lag term "1+T*s", which models the time (e.g., in T seconds) for the steering rate to develop after application of the steering angle. In some embodiments, control loop parameters K and T are unique for different vehicles, and K and/or T may be dependent on a speed of the vehicle in a medium, such as air or water. In other embodiments, the transfer function may be implemented as a different function according to a particular type of vehicle being modeled, a type of steering mechanism being used, and/or a type of control loop being implemented.

In various embodiments, the vehicle dynamics module may be used to model a variety of different actual vehicles (e.g., planes, automobiles, watercraft) and adaptively train the remainder of control loop 200 to a particular vehicle (e.g., vehicle 102) or group of vehicles, through iteration. In the embodiment shown in FIG. 2, block 252 provides a modeled yaw rate (e.g., corresponding to a measured steering rate of vehicle 102) as output to block 256, and block 256 includes an integrator integrating the output of block 252 to provide a modeled heading 257 (e.g., corresponding to a measured heading of vehicle 102) to block 202. Outputs of various blocks (e.g., blocks 220, 222, 252 and/or block 256) may be set as initial conditions prior to controller 110 executing block 202.

In block 202, controller 110 receives target heading 106 and modeled heading 257 from block 256 and combines them to produce an error output that is then provided to block 204. For example, controller 110 may be adapted to receive target heading 106 as user input from user interface 140 and modeled heading 257 as an initial condition set for block 256 or a calculated modeled heading based on an output of block 252. In some embodiments, the error output may represent a difference between target heading 106 and modeled heading 257. In various embodiments, controller 110 may be configured to store the error output of block 202 before proceeding to block 204.

In block 204, controller 110 uses and/or executes, for example, a proportional-derivative controller module to receive the error output of block 202 and provide a steering demand (e.g., a rudder demand) to block 208. Various parameters of block 204 may be used to determine the steering demand output by block 204. In some embodiments, block 204 may be implemented as a proportional-derivative-integral controller with one or more of the corresponding gain terms (e.g., proportional, derivative, and/or integral) set to zero. In one embodiment, parameters of the proportional-derivative controller module may be managed to produce a critically damped response with a time constant of 6*Tn (e.g., where Tn is defined below in connection with block 214) and with a damping ratio of 1.25, for example, to sufficiently tune the proportional-derivative controller module for relatively high vehicle speeds.

In other embodiments, controller 110 may be configured to modify one or more of the parameters, gain terms, a deadband, and/or a limit on the output of the proportional-derivative or proportional-derivative-integral controller module based on a responsiveness setting received from user interface 140 (e.g., before, after, or at approximately the same time target heading 106 is received). For example, a responsiveness setting (e.g., Performance, Cruising, Economy) may allow a user to choose between a sharper response or reduced steering mechanism (e.g., rudder 132) activity, as described herein. In further embodiments, controller 110 may be configured to modify one or more of the gain terms and/or other parameters of block 204 based on adaptive training of control loop 200. In various embodiments, controller 110 may be configured to store the steering demand output of block 204 before proceeding to block 208.

In block 208, controller 110 receives a steering demand (e.g., a rudder demand) from block 204 and a filtered nominal vehicle feedback signal from block 222 and combines them to produce an adjusted steering demand (e.g., an adjusted rudder demand) that is then provided to blocks 212 and 252. In some embodiments, the adjusted steering demand may represent a difference between the steering demand and the filtered nominal vehicle feedback signal. In further embodiments, the filtered nominal vehicle feedback signal from block 222 may be an initial condition set for block 222. In various embodiments, controller 110 may be configured to store the adjusted steering demand output of block 208 before proceeding to blocks 212 and/or 252.

In block 212, controller 110 receives an adjusted steering demand from block 208 and a nominal vehicle feedback signal from block 220 and combines them to produce a further adjusted steering demand that is then provided to block 214. In some embodiments, the further adjusted steering demand may represent a difference between the adjusted steering demand and the nominal vehicle feedback signal. In further embodiments, the nominal vehicle feedback signal from block 220 may be an initial condition set for block 220. In various embodiments, controller 110 may be configured to store the further adjusted steering demand output of block 212 before proceeding to block 214.

As noted above, block 252 includes a vehicle dynamics module that may be implemented as a transfer function in the S-plane (e.g., a Laplace domain transfer function) that can be adapted to model behavior of vehicle 102 and/or any number of other vehicles according to various steering rate gain terms, steering rate lag terms, and/or various transfer functions. For example controller 110 may be adapted to use and/or execute a vehicle dynamics module to receive the adjusted steering demand provided by block 208 and provide a modeled steering rate (e.g., modeled yaw rate) to blocks 216 and 256. In some embodiments, block 252 may be used to implement an adaptive algorithm for training various control loop parameters of control loop 200 without necessitating a real-time trial run of vehicle 102. In various embodiments, controller 110 may be configured to store the modeled steering rate output of block 252 before proceeding to blocks 216 and/or 256.

In block 214, controller 110 uses and/or executes a nominal vehicle predictor to receive, process, and/or operate on a further adjusted steering demand from block 212 and provide a nominal vehicle steering rate (e.g., a nominal vehicle yaw rate, in some embodiments) to block 216. In similar fashion to the vehicle dynamics module of block 252, the nominal vehicle predictor may be implemented as a transfer function (e.g., in the S-plane) adapted to model dynamics of a nominal vehicle derived, at least in part, from a selection of vehicles, as described herein. In one embodiment, the transfer function may be implemented in the form of a ratio of a nominal vehicle steering rate gain term "Kn" to a nominal vehicle steering rate lag term "1−Tn*s".

For example, the nominal vehicle steering rate gain term "Kn" may be equal to the ratio (steering rate)/(steering angle), which models the amount of steering rate achieved for a nominal vehicle for each degree of steering angle. The nominal vehicle steering rate gain term "Kn" can be corrected by the nominal vehicle steering rate lag term "1+Tn*s", which models the time (e.g., in Tn seconds) for the steering rate to develop after application of the steering angle. In some embodiments, control loop parameters Kn and/or Tn may be dependent on a speed of the nominal vehicle in a medium, such as air or water. In such embodiments, the speed of the controlled vehicle may be used as the speed of the nominal vehicle. In other embodiments, the transfer function may, be implemented as a different function according to a particular type of nominal vehicle being modeled, a type of steering mechanism being controlled, and/or a type of control loop being implemented.

In some embodiments, Kn and Tn may be set to respective mean values of a population of vehicles to be controlled, for example, as a function of speed. In other embodiments, Kn may be set to exceed a majority of and/or all K values of a population of vehicles to be controlled, as a function of speed, to reduce a risk of excessive steering actuator activity. In further embodiments, Tn may be set to exceed a majority of and/or all T values of a population of vehicles to be controlled, as a function of speed, and/or above 1 second to reduce a risk of excessive steering actuator activity and/or to reduce a need for a high clocking rate of controller 110 (e.g., above 100 Hz). In some embodiments, the population of vehicles to be controlled may correspond to a type of vehicle, such as a type of plane, automobile, or watercraft (e.g., sailboat, powerboat, ship, submarine, and/or other vessel capable of operating in or on water). In various embodiments, values of K and T for a population of vehicles may be determined and/or approximated through performance of real-time trials, control loop modeling (e.g., using one or more of the control loops described herein), and/or estimation.

Advantageously, the nominal vehicle predictor may be implemented as a transfer function acting on only one of the two state variables (e.g., heading and steering rate) of the control loop, which makes implementation easier due to, at least in part, a reduced need for computing resources. In various embodiments, controller 110 may be configured to store the nominal vehicle steering rate output of block 214 before proceeding to block 216.

In block 216, controller 110 receives a modeled steering rate from block 252 and a nominal vehicle steering rate (e.g., a nominal vehicle yaw rate, in some embodiments) from block 214 and combines them to produce a differential steering rate that is then provided to block 218. In some embodiments, the differential steering rate may represent a difference between the modeled steering rate and the nominal vehicle steering rate. In various embodiments, controller 110 may be configured to store the differential steering rate output of block 216 before proceeding to block 218.

In blocks 218 and 220, controller 110 receives a differential steering rate from block 216, integrates the differential steering rate (e.g., block 218), and applies a feedback gain (e.g., block 220) to the integrated difference to produce a nominal vehicle feedback signal that is then provided to blocks 212 and 222. In one embodiment, block 218 includes an integrator similar to the integrator of block 256. In some embodiments, the gain applied by block 220 is relatively large. For example, in one embodiment, the gain applied by block 220 is approximately 500. In further embodiments, the gain applied by block 220 is a control loop parameter that may be modified by user input and/or adaptive training by control loop 200. In various embodiments, controller 110 may be configured to store the nominal vehicle feedback signal output of blocks 218 and 220 before proceeding to blocks 212 and/or 222.

In additional embodiments, a sub-control loop including at least blocks 212, 214, 216, 218, and/or 220 may be iterated multiple times for each update of, for example, blocks 208 and/or 252. In such embodiments, inputs of blocks 212 and/or 216 corresponding to outputs of blocks 208 and/or 252 may be set to a prior-used value for a number of iterations of the sub-control loop. In some embodiments, such a sub-control loop may be implemented as a device and/or instructions separate from a device and/or instructions implementing blocks 202 and/or 204, for example. For instance, block 204 may be implemented as an electronic device separate from controller 110 in FIG. 1.

In block 222, controller 110 filters a nominal vehicle feedback signal output by block 220 and provides a filtered nominal vehicle feedback signal to block 208. In some embodiments, block 222 may be implemented as a low pass filter. In further embodiments, block 222 may be implemented with a selectable bandwidth that can be modified based on a user-selectable responsiveness setting. In other embodiments, the filter bandwidth is a control loop parameter that may be modified based on a received user input and/or adaptive training implemented with control loop 200. For example, the filter bandwidth may be modified based on a target acceptable output noise level in the adjusted steering demand provided by block 208. In various embodiments, controller 110 may be configured to store the filtered nominal vehicle feedback signal output of block 222 before continuing with control loop 200.

In additional embodiments, a sub-control loop including at least blocks 208, 212, 214, 216, 218, 220, 222, and/or 252 may be iterated multiple times for each update of, for example, blocks 204 and/or 256. In such embodiments, an input of block 208 corresponding to an output of block 204 may be set to a prior-used value for a number of iterations of the sub-control loop. In some embodiments, such a sub-control loop may be implemented as a device and/or instructions separate from a device and/or instructions implementing blocks 202 and/or 204, for example. For instance, blocks 202 and/or 204 may be implemented as an electronic device separate from controller 110 in FIG. 1.

As noted above, block 256 includes an integrator that integrates the output of block 252 to provide modeled heading 257 to block 202. In some embodiments, controller 110 may be configured to store modeled heading 257 output by block 256 before continuing with control loop 200.

Because control loop 200 includes a proportional-differential controller module (e.g., block 204) and a nominal vehicle predictor (e.g., block 214), embodiments of control loop 200 may be implemented as a critically damped control loop with a higher bandwidth (e.g., responsiveness) than if the nominal vehicle predictor were acting alone to stabilize directional control of, for example, vehicle 102. For example, a controller implementing control loop 200 may be a proportional-derivative controller allowing freedom to design a critically damped controller with higher bandwidth than if a nominal vehicle predictor were acting alone to stabilize yaw (e.g., in some embodiments, the nominal vehicle predictor feedback may pass through a filter with relatively low bandwidth because a high gain in the nominal vehicle predictor can introduce noise).

Figure 3:
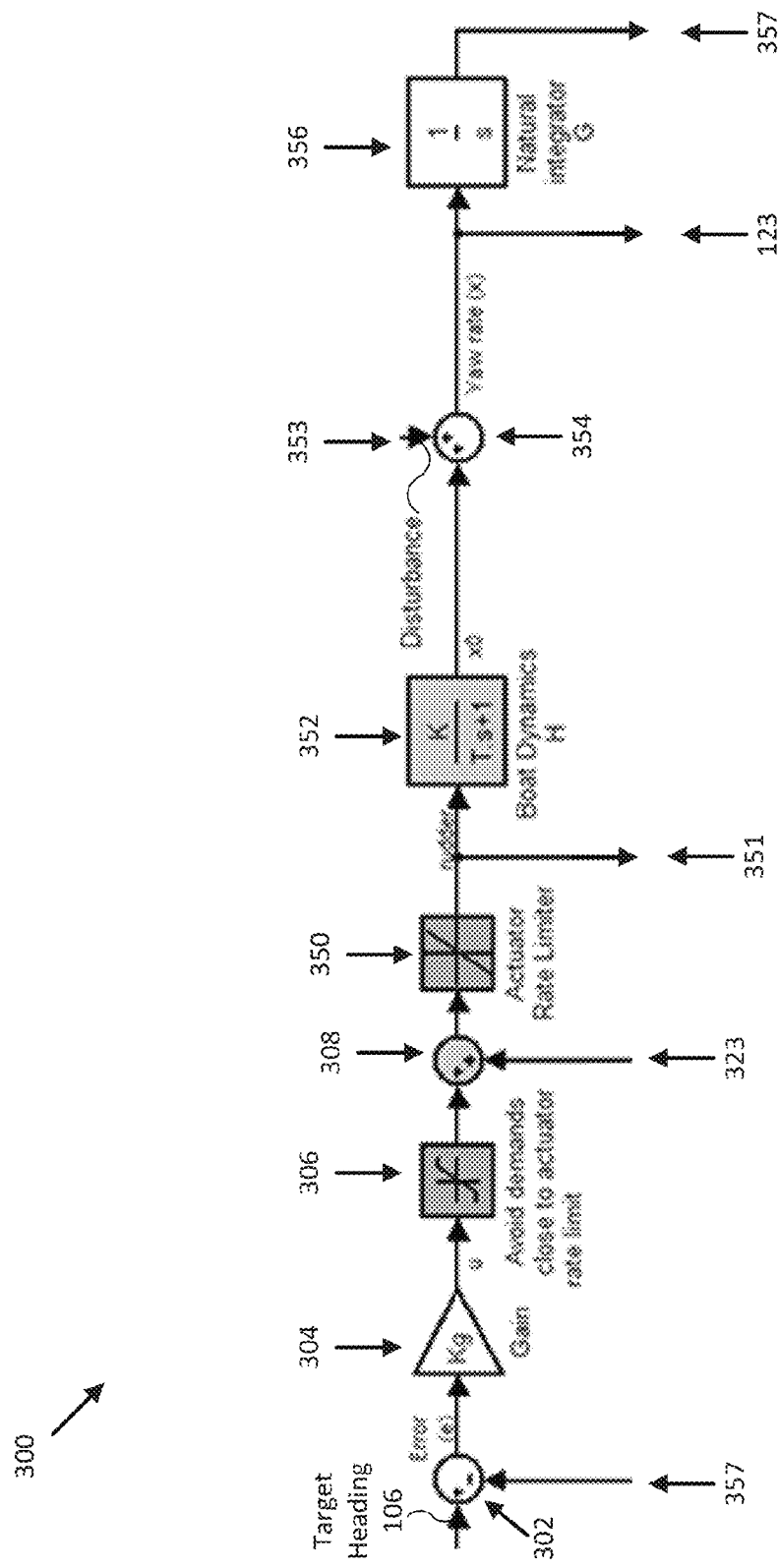
FIG. 3 illustrates a flow diagram of a control loop to provide stabilized directional control in accordance with an embodiment of the disclosure.

FIG. 3 illustrates a flow diagram of a control loop 300 to provide stabilized directional control for vehicle 102 in accordance with an embodiment of the disclosure. In some embodiments, the operations of FIG. 3 may be performed by controller 110 processing and/or operating on measurements received from one or more of sensors 120-126, steering sensor/actuator 130, user interface 140, and/or other modules 150. Each block may be implemented entirely as instructions executed by controller 110, for example, or may be implemented in a combination of executable instructions and hardware, such as one or more inductors, capacitors, resistors, digital signal processors, and other analog and/or digital electronic devices. It should be appreciated that any step, sub-step, sub-process, or block of control loop 300 may be performed in an order or arrangement different from the embodiment illustrated by FIG. 3. For example, although control loop 300 includes block 350, in other embodiments, block 350 may not be present, for example, and/or may be replaced with steering sensor/actuator 130.

As shown in FIG. 3, block 352 of control loop 300 includes a vehicle dynamics module similar to the vehicle dynamics module described in connection with block 252 of control loop 200, and block 352 provides a similar modeled steering rate as output to block 354. Furthermore, block 356 corresponds to block 256 of control loop 200 and provides a modeled heading to block 302 over path 357. Additionally, control loop 300 includes paths 323, 351, and 123 corresponding to connections, paths, and/or structure depicted in FIG. 2. In some embodiments, path 323 corresponds to the connection from block 222 to block 208, path 351 corresponds to the connection from block 208 to block 212, and path 123 corresponds to the connection from block 252 to block 216. In such embodiments, control loop 300 includes blocks 212 through 222 arranged in appropriate fashion. Outputs of various blocks, including block 350, may be set as initial conditions prior to controller 110 executing block 302.

In block 302, controller 110 receives target heading 106 and a modeled heading from block 356 and combines them to produce an error output that is then provided to block 304. For example, controller 110 may be adapted to receive target heading 106 as user input from user interface 140 and a modeled heading that is an initial condition set for block 356 or a calculated modeled heading based on an output of block 352. In some embodiments, the error output may represent a difference between target heading 106 and the modeled heading. In various embodiments, controller 110 may be configured to store the error output of block 302 before proceeding to block 304.

In block 304, controller 110 applies a gain to the error output of block 302 and provides a steering demand (e.g., a rudder demand) to block 306. Various parameters of block 304 may be used to determine the steering demand output by block 304. In some embodiments, block 304 may be implemented as a proportional-derivative-integral controller with one or more of the corresponding gain terms (e.g., proportional, derivative, and/or integral) set to zero. In one embodiment, parameters of a proportional-derivative-integral controller module may be managed to produce a critically damped response with a time constant of 6*Tn (e.g., where Tn is defined below in connection with block 214) and with a damping ratio of 1.25, for example, to sufficiently tune the proportional-derivative-integral controller module for relatively high vehicle speeds.

In other embodiments, controller 110 may be configured to modify one or more of the parameters, gain terms, a deadband, and/or a limit on the output of a proportional-derivative-integral controller module based on a responsiveness setting received from user interface 140 (e.g., before, after, or at approximately the same time target heading 106 is received). In further embodiments, controller 110 may be configured to modify one or more of the gain terms and/or other parameters of block 204 based on adaptive training of control loop 200. In various embodiments, controller 110 may be configured to store the steering demand output of block 304 before proceeding to block 306.

In block 306, controller 110 uses and/or executes a steering demand limiter to receive the steering demand output of block 304 and provide a limited steering demand (e.g., a rudder demand) to block 208. In some embodiments, the steering demand limiter may be adapted to limit the steering demand to produce a steering actuator rate demand less than a steering actuator rate limit and/or a steering demand less than a steering actuator angle limit. For example, a steering actuator may be implemented to have a steering actuator rate limit "R". A steering actuator rate may be directly proportional to a steering demand multiplied by the proportional gain term "Kg" of block 304 and the steering rate gain term "K", as defined herein, for the particular vehicle being controlled. To ensure the steering actuator rate is less than the steering actuator rate limit "R", it is sufficient to limit the steering demand (e.g., rudder demand) provided by block 304 according to the steering actuator rate limit equation:

steering demand<$R/(K*Kg)$;

where K is the forward gain of the vehicle, as defined herein, and Kg represents the degree of steering demand (e.g., rudder demand) for each degree of error (e.g., degree of heading error) output by block 302.

In some embodiments, Kg may be an overall gain provided by an embodiment of block 304 including a proportional-derivative controller or a proportional-derivative-integral controller. In further embodiments, where K for the vehicle being controlled is unknown, K can be determined by an autolearn procedure in an initial directional control trial, for example, or may be brought to a nominal or target value through use of an adaptive algorithm utilizing an appropriate control loop including a nominal vehicle predictor, such as control loop 200 in FIG. 2. In still further embodiments, the steering actuator rate limit equation may be modified to replace "K" with one or more terms including corrections for lag and other second order effects, as described herein. In various embodiments, controller 110 may be configured to store the limited steering demand output of block 306 before proceeding to block 308.

In block 308, controller 110 receives a limited steering demand (e.g., a limited rudder demand) from block 306 and, for example, a filtered nominal vehicle feedback signal over path 323 and combines them to produce an adjusted steering demand (e.g., an adjusted rudder demand) that is then provided to block 350. In some embodiments, the adjusted steering demand may represent a difference between the limited steering demand and the filtered nominal vehicle feedback signal. In further embodiments, the filtered nominal vehicle feedback signal may be an initial condition set by controller 110. In various embodiments, controller 110 may be configured to store the adjusted steering demand output of block 308 before proceeding to block 350.

In block 350, controller 110 uses and/or executes an actuator rate limiter adapted to receive an adjusted steering demand from block 308 and provide a modeled steering angle (e.g., corresponding to a measured steering angle sensed by steering sensor/actuator 130 in FIG. 1) to block 352 and path 351. In some embodiments, the actuator rate limiter may be designed to model the response of an actual steering actuator to a steering demand, including a response based on a steering actuator rate limit "R" and/or a steering actuator angle limit, as described herein. Thus, even if the adjusted steering demand output provided by block 308 produces a steering actuator rate demand exceeding a steering actuator rate limit "R", and/or a steering demand exceeding a steering actuator angle limit, of the actuator rate limiter of block 350, the modeled steering angle output by block 350 will conform to the modeled steering actuator response. In some embodiments, block 350 may be used to implement an adaptive algorithm for training various control loop parameters of a control loop without necessitating a real-time trial run of a vehicle. In various embodiments, controller 110 may be configured to store the modeled steering angle output of block 350 before proceeding to block 352, or to other blocks connected through path 351.

As noted above, block 352 includes a vehicle dynamics module that may be implemented as a transfer function in the S-plane (e.g., a Laplace domain transfer function) that can be adapted to model behavior of vehicle 102 and/or any number of other vehicles according to various steering rate gain terms, steering rate lag terms, and/or various transfer functions described similarly in connection with block 252 of FIG. 2. For example controller 110 may be adapted to use and/or execute a vehicle dynamics module to receive the modeled steering angle provided by block 350 and provide a modeled steering rate (e.g., modeled yaw rate) to block 354. In various embodiments, controller 110 may be configured to store the modeled steering rate output of block 352 before proceeding to block 354.

In block 354, controller 110 may be configured to combine a modeled steering rate with an additional disturbance feedback signal provided over path 353 and provide an adjusted modeled steering rate to block 356 and path 123. For example, the additional disturbance may be implemented as a transfer function accepting one or more state variables of control loop 300 and outputting a feedback signal adjusting the modeled steering rate output by block 352. In some embodiments, the additional disturbance may correspond to a lateral air and/or water current component affecting motion of vehicle 102, for example. In other embodiments, the additional disturbance may be negligible. In various embodiments, controller 110 may be configured to store the adjusted modeled steering rate output of block 354 before proceeding to block 356, or to other blocks connected through path 123.

As noted above, block 356 includes an integrator that integrates the output of block 354 to provide a modeled heading to block 302 over path 357. In some embodiments, controller 110 may be configured to store the modeled heading output of block 356 before continuing with control loop 300.

Because control loop 300 includes a steering demand limiter, embodiments of control loop 300 may be implemented to avoid non-linear control loop responses corresponding to steering demands producing a steering actuator rate demand exceeding a steering actuator rate limit and/or a steering demand exceeding a steering actuator angle limit.

Figure 4:
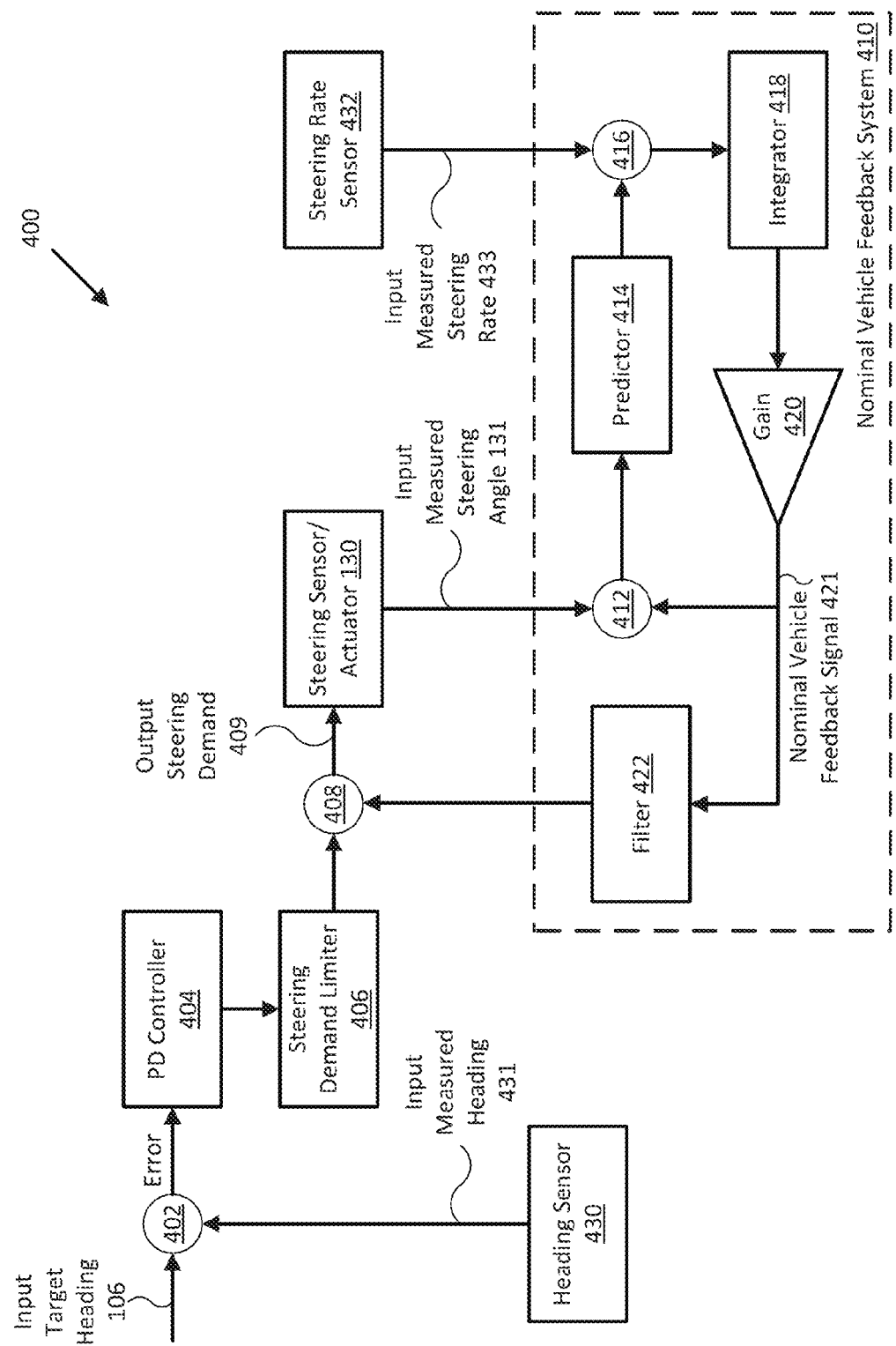
FIG. 4 illustrates a flow diagram of a control loop to provide stabilized directional control in accordance with an embodiment of the disclosure.

FIG. 4 illustrates a flow diagram of a control loop 400 to provide stabilized directional control in accordance with an embodiment of the disclosure. In some embodiments, the operations of FIG. 4 may be performed by controller 110 processing and/or operating on measurements (e.g., sensor signals) received from one or more of sensors 120-126, steering sensor/actuator 130, user interface 140, and/or other modules 150. Each block may be implemented entirely as instructions executed by controller 110, for example, or may be implemented in a combination of executable instructions and hardware. It should be appreciated that any step, sub-step, sub-process, or block of control loop 400 may be performed in an order or arrangement different from the embodiment illustrated by FIG. 4. For example, although control loop 400 includes block 406, in other embodiments, block 406 may not be present. In various embodiments, control loop 400 may include various aspects of control loop 200 of FIG. 2 and/or control loop 300 of FIG. 3.

For example, as shown in FIG. 4, control loop 400 includes nominal vehicle feedback system 410 corresponding to aspects of control loop 200, and control loop 400 includes block 406 corresponding to aspects of control loop 300. Additionally, blocks and/or modules providing modeled data in control loops 200 and/or 300 are absent in control loop 400 and replaced with one or more sensors providing measured data in place of the modeled data.

In block 402, controller 110 receives target heading 106 and a measured heading 431 from heading sensor 430 and combines them to produce an error output that is then provided to block 404. For example, controller 110 may be adapted to receive target heading 106 as user input from user interface 140 and measured heading 431 as a sensor signal provided by, for example, orientation sensor 120. In other embodiments, heading sensor 430 may be implemented as one or more of sensors 120-126 and/or other modules 150. In some embodiments, the error output may represent a difference between target heading 106 and measured heading 431. In various embodiments, controller 110 may be configured to store the error output of block 402 before proceeding to block 404.

In block 404, controller 110 uses and/or executes, for example, a proportional-derivative controller module to receive the error output of block 402 and provide a steering demand to block 406. Various parameters of block 404 may be used to determine the steering demand output by block 404. In some embodiments, block 404 may be implemented as a proportional-derivative-integral controller with one or more of the corresponding gain terms (e.g., proportional, derivative, and/or integral) set to zero. In one embodiment, parameters of the proportional-derivative controller module may be managed to produce a critically damped response with a time constant of 6*Tn (e.g., where Tn is defined below in connection with block 214) and with a damping ratio of 1.25, for example, to sufficiently tune the proportional-derivative controller module for relatively high vehicle speeds.

In other embodiments, controller 110 may be configured to modify one or more of the parameters, gain terms, a deadband, and/or a limit on the output of the proportional-derivative or proportional-derivative-integral controller module based on a responsiveness setting received from user interface 140 (e.g., before, after, or at approximately the same time target heading 106 is received). In further embodiments, controller 110 may be configured to modify one or more of the gain terms and/or other parameters of block 404 based on adaptive training of control loop 400, as described herein. In various embodiments, controller 110 may be configured to store the steering demand output of block 404 before proceeding to block 406.

In block 406, controller 110 uses and/or executes a steering demand limiter to receive the steering demand output of block 404 and provide a limited steering demand (e.g., a rudder demand) to block 408. In some embodiments, the steering demand limiter may be adapted to limit the steering demand to produce a steering actuator rate demand less than a steering actuator rate limit and/or a steering demand less than a steering actuator angle limit. For example, steering sensor/actuator 130 may be implemented to have a steering actuator rate limit "R". A steering actuator rate demand may be directly proportional to a steering demand multiplied by a proportional gain term "Kg" of block 404 and a steering rate gain term "K", as defined herein, for vehicle 102. To ensure the steering actuator rate is less than the steering actuator rate limit "R", it is sufficient to limit the steering demand provided by block 404 according to the steering actuator rate limit equation:

$$\text{steering demand} < R/(K*Kg);$$

where K is the forward gain of the vehicle, as defined herein, and Kg represents the degree of steering demand (e.g., rudder demand) for each degree of error (e.g., degree of heading error) output by block 402.

In some embodiments, Kg may be an overall gain provided by an embodiment of block 404 including a proportional-derivative controller or a proportional-derivative-integral controller. In further embodiments, where K for vehicle 102 is unknown, K can be determined by an autolearn procedure in an initial directional control trial, for example, or may be brought to a nominal or target value through use of an adaptive algorithm utilizing an appropriate control loop including a nominal vehicle predictor, such as control loop 200 in FIG. 2 or control loop 400. In still further embodiments, the steering actuator rate limit equation may be modified to replace "K" with a term including corrections for lag and other second order effects, as described herein. In various embodiments, controller 110 may be configured to store the limited steering demand output of block 406 before proceeding to block 408.

In block 408, controller 110 receives a limited steering demand from block 406 and a filtered nominal vehicle feedback signal from block 422 and combines them to produce an adjusted steering demand 409 that is then provided (e.g., as a controller signal) to steering sensor/actuator 130. In some embodiments, adjusted steering demand 409 may represent a difference between the limited steering demand and the filtered nominal vehicle feedback signal. In further embodiments, the filtered nominal vehicle feedback signal from block 422 may be an initial condition set for block 422. In still further embodiments, the filtered nominal vehicle feedback signal from block 422 may be determined by nominal vehicle feedback system 410 using measured inputs as shown. In various embodiments, controller 110 may be configured to store adjusted steering demand 409 before proceeding to block 412.

In block 412, controller 110 receives a measured steering angle 131 (e.g., as a sensor signal) from steering sensor/actuator 130 and a nominal vehicle feedback signal from block 420 and combines them to produce an adjusted measured steering angle that is then provided to block 414. In some embodiments, the adjusted measured steering angle may represent a difference between measured steering angle 131 and the nominal vehicle feedback signal. In further embodiments, the nominal vehicle feedback signal from block 420 may be an initial condition set for block 220. In still further embodiments, the nominal vehicle feedback signal from block 420 may be determined by nominal vehicle feedback system 410 using measured inputs as shown.

Measured steering angle 131 may be a steering angle (e.g., rudder angle) of vehicle 102 sensed by steering sensor/actuator 130, for example, and may depend, at least in part, on steering demand 409 provided to steering sensor/actuator 130. For instance, in embodiments where steering sensor/actuator 130 can meet the requested steering demand 409 within an update time of at least a portion of control loop 400, steering angle 131 may substantially equal steering demand 409. In other embodiments, steering angle 131 may be proportional to steering demand 409, for example.

In various embodiments, controller 110 may be configured to store the adjusted measured steering angle output of block 412 before proceeding to block 414.

In block 414, controller 110 uses and/or executes a nominal vehicle predictor to receive, process, and/or operate on an adjusted measured steering angle from block 412 and provide a nominal vehicle steering rate to block 416. In some embodiments, the nominal vehicle predictor may be implemented as a transfer function (e.g., in the S-plane) adapted to model dynamics of a nominal vehicle derived, at least in part, from a selection of vehicles, as described herein. In one embodiment, the transfer function may be implemented in the form of a ratio of a nominal vehicle steering rate gain term "Kn" to a nominal vehicle steering rate lag term "1+Tn*s", as described similarly in connection with block 214 of FIG. 2.

For example, the nominal vehicle steering rate gain term "Kn" may be equal to the ratio (steering rate)/(steering angle), which models the amount of steering rate (e.g., yaw rate, in some embodiments) achieved for a nominal vehicle for each degree of steering angle. In some embodiments, the nominal vehicle steering rate gain term "Kn" may be corrected by the nominal vehicle steering rate lag term "1+Tn*s", which models the time (e.g., in Tn seconds) for the steering rate to develop after application of the steering angle. In some embodiments, control loop parameters Kn and/or Tn may be dependent on a speed of the nominal vehicle in a medium, such as air or water. In such embodiments, the speed of the controlled vehicle may be used as the speed of the nominal vehicle. In other embodiments, the transfer function may be implemented as a different function according to a particular type of nominal vehicle being modeled, a type of steering mechanism being controlled, and/or a type of control loop being implemented.

In some embodiments, Kn and Tn may be set to respective mean values of a population of vehicles to be controlled, for example, as a function of speed. In other embodiments, Kn may be set to exceed a majority of and/or all K values of a population of vehicles to be controlled, as a function of speed, to reduce a risk of excessive steering actuator activity. In further embodiments, Tn may be set to exceed a majority of and/or all T values of a population of vehicles to be controlled, as a function of speed, and/or above 1 second to reduce a risk of excessive steering actuator activity and/or to reduce a need for a high clocking rate of controller 110 (e.g., above 100 Hz). In some embodiments, the population of vehicles to be controlled may correspond to a type of vehicle, such as a type of plane, automobile, or watercraft (e.g., sailboat, powerboat, ship, submarine, and/or other vessel capable of operating in or on water). In various embodiments, values of K and T for a population of vehicles may be determined and/or approximated through performance of real-time trials, control loop modeling (e.g., using one or more of the control loops described herein), and/or estimation.

Advantageously, the nominal vehicle predictor may be implemented as a transfer function acting on only one (e.g., steering rate) of the two state variables (e.g., heading and steering rate) of the control loop, which makes implementation easier due to, at least in part, a reduced need for computing resources. In various embodiments, controller 110 may be configured to store the nominal vehicle steering rate output of block 414 before proceeding to block 416.

In block 416, controller 110 receives a measured steering rate 433 (e.g., as a sensor signal) from steering rate sensor 432 and a nominal vehicle steering rate from block 414 and combines them to produce a differential steering rate that is then provided to block 418. In some embodiments, the differential steering rate may represent a difference between measured steering rate 433 and the nominal vehicle steering rate. In various embodiments, steering rate sensor 432 may be implemented as one or more of orientation sensor 120, gyroscope and/or accelerometer 122, speed sensor 124, GPS 126, steering sensor/actuator 130, and/or other modules 150. For example, controller 110 may be adapted to determine a measured steering rate from sensor signals received from one or more of sensors 120-126, gyro/accelerometer 130, and/or other modules 150. In further embodiments, controller 110 may be configured to store the differential steering rate output of block 416 before proceeding to block 418.

In blocks 418 and 420, controller 110 receives a differential steering rate from block 416, integrates the differential steering rate (e.g., block 418), and applies a feedback gain (e.g., block 420) to the integrated difference to produce a nominal vehicle feedback signal 421 that is then provided to blocks 212 and 222. In one embodiment, block 218 includes an integrator similar to the integrator of block 256 in FIG. 2. In some embodiments, the gain applied by block 420 is relatively large. For example, in one embodiment, the gain applied by block 420 is between approximately 400 and 500. In further embodiments, the gain applied by block 220 is a control loop parameter that may be modified by user input and/or adaptive training by control loop 400. In various embodiments, controller 110 may be configured to store nominal vehicle feedback signal 421 before proceeding to blocks 412 and/or 422.

In additional embodiments, a sub-control loop including at least blocks 412, 414, 416, 418, and/or 420 may be iterated multiple times for each update of, for example, measured steering angle 131 and/or measured steering rate 433. In such embodiments, inputs of blocks 412 and/or 416 corresponding to measured steering angle 131 and/or measured steering rate 433 may be set to a prior-used value for a number of iterations of the sub-control loop. In some embodiments, such a sub-control loop (e.g., nominal vehicle feedback system 410, optionally including block 422) may be implemented as a device and/or instructions separate from a device and/or instructions implementing one or more of the remaining blocks of control loop 400, for example. For instance, block 404 and/or nominal vehicle feedback system 410 may be implemented as separate electronic devices.

In block 422, controller 110 filters a nominal vehicle feedback signal output by block 420 and provides a filtered nominal vehicle feedback signal to block 408. In some embodiments, block 422 may be implemented as a low pass filter. In further embodiments, block 422 may be implemented with a selectable bandwidth that can be modified based on a user-selectable responsiveness setting. In other embodiments, the filter bandwidth is a control loop parameter that may be modified based on a received user input and/or adaptive training implemented with control loop 400. For example, the filter bandwidth may be modified based on a target acceptable output noise level in adjusted steering demand 409. In various embodiments, controller 110 may be configured to store the filtered nominal vehicle feedback signal output of block 422 before continuing with control loop 400.

In additional embodiments, a sub-control loop including blocks 408, 412, 414, 416, 418, 420, and/or 422 may be iterated multiple times for each update of, for example, blocks 404 and/or 406. In such embodiments, an input of block 408 corresponding to an output of block 406 may be set to a prior-used value for a number of iterations of the sub-control loop. In some embodiments, such a sub-control loop may be implemented as a device and/or instructions separate from a device and/or instructions implementing one or more of the remaining blocks of control loop 400, for example. For instance, blocks 402 and/or 404 may be implemented as an electronic device separate from controller 110 in FIG. 1.

In one embodiment, nominal vehicle feedback system 410 may be implemented as an electronic device adapted to be installed on a vehicle with an existing directional control system including a proportional-derivative and/or proportional derivative controller module (e.g., similar to block 204 of FIG. 2, block 304 of FIG. 3, and/or block 404 of FIG. 4) and one or more components similar to sensors 120-126, steering sensor/actuator 130, and/or other modules 150 of FIG. 1.

Because control loop 400 includes a proportional-differential controller module (e.g., block 404) and a nominal vehicle predictor (e.g., block 414), embodiments of control loop 400 may be implemented as a critically damped control loop with a higher bandwidth (e.g., responsiveness) than if the nominal vehicle predictor were acting alone to stabilize directional control of, for example, vehicle 102. Because control loop 400 also includes a steering demand limiter (e.g., block 406), embodiments of control loop 400 may be implemented to avoid non-linear control loop responses corresponding to steering demands producing a steering actuator rate demand exceeding a steering actuator rate limit and/or a steering demand exceeding a steering actuator angle limit.

In accordance with various embodiments of the present disclosure, various control loop parameters, user inputs, sensor signals, controller signals, and other data, parameters, and/or signals described in connection with system 100 and/or control loops 200, 300 or 400 may be stored at various points in the control loops, including within and/or during execution of any one of the blocks of a particular control loop.

Where applicable, various embodiments provided by the present disclosure can be implemented using hardware, software, or combinations of hardware and software. Also where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the spirit of the present disclosure. In addition, where applicable, it is contemplated that software components can be implemented as hardware components, and vice-versa.

Software in accordance with the present disclosure, such as non-transitory instructions, program code, and/or data, can be stored on one or more non-transitory machine readable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

Embodiments described above illustrate but do not limit the invention. It should also be understood that numerous modifications and variations are possible in accordance with the principles of the invention. Accordingly, the scope of the invention is defined only by the following claims.

What is claimed is:

1. A system comprising:
a logic device configured to receive one or more sensor signals and generate one or more controller signals to provide directional control for a vehicle, wherein the logic device is configured to:
receive a steering angle and a yaw rate of the vehicle, wherein the steering angle is based, at least in part, on a steering demand;
determine a nominal vehicle steering rate by processing the steering angle with a nominal vehicle predictor to produce the nominal vehicle steering rate, wherein the nominal vehicle predictor is implemented as a transfer function modeling dynamics of a nominal vehicle derived, at least in part, from a selection of vehicles; and
determine a nominal vehicle feedback signal based, at least in part, on a combination of the nominal vehicle steering rate and the yaw rate, wherein the nominal vehicle feedback signal is provided to adjust the steering demand, and wherein the processing the steering angle with the nominal vehicle predictor comprises processing the steering angle, adjusted by the nominal vehicle feedback signal, with the nominal vehicle predictor and receiving the nominal vehicle steering rate from the nominal vehicle predictor.

2. The system of claim 1, wherein the
vehicle comprises a watercraft.

3. The system of claim 1, wherein the transfer function comprises a ratio of a nominal vehicle steering rate gain term to a nominal vehicle steering rate lag term.

4. The system of claim 1, wherein the determine the nominal vehicle feedback signal comprises:
determining a difference between the yaw rate and the nominal vehicle steering rate;
integrating the difference; and
applying a feedback gain to the integrated difference to determine the nominal vehicle feedback signal.

5. The system of claim 1, further comprising a heading sensor, wherein the logic device is configured to:
receive a target heading;
receive a heading of the vehicle from the heading sensor; and
determine the steering demand, wherein the steering demand is based, at least in part, on a difference between the target heading and the heading.

6. The system of claim 5, wherein:
the logic device is configured to limit the steering demand to produce a steering actuator rate demand less than a steering actuator rate limit and/or a steering demand less than a steering actuator angle limit.

7. The system of claim 5, further comprising a user interface, wherein the logic device is configured to:
receive a user-selectable responsiveness setting from the user interface; and
modify, based on the responsiveness setting, one or more gains, a deadband, and/or a limit used to determine the steering demand.

8. The system of claim 1, wherein:
the logic device is configured to provide the steering demand to a steering actuator; and the steering demand is adjusted by the nominal vehicle feedback signal prior to being provided to the steering actuator.

9. The system of claim 1, wherein:
the logic device is configured to provide the nominal vehicle feedback signal to a bandwidth-selectable low-pass filter;
the filtered nominal vehicle feedback signal is used to adjust the steering demand; and
a bandwidth of the low-pass filter is modified based on a user-selectable responsiveness setting.

10. The system of claim 1, wherein:
the yaw rate is a compensated yaw rate of the vehicle; and
the compensated yaw rate is determined after a pitch, pitch rate, roll, and/or roll rate of the vehicle are determined to reduce a pitch-induced noise in the compensated yaw rate.

11. The system of claim 1, further comprising:
a steering actuator receiving the steering demand provided as one of the controller signals, wherein the steering actuator controls a watercraft rudder; and
a steering sensor and a steering rate sensor providing the steering angle and the yaw rate as one or more of the sensor signals, wherein the steering and/or steering rate sensors are fixed relative to the vehicle.

12. A method comprising:
receiving a steering angle and a yaw rate of a vehicle, wherein the steering angle is based, at least in part, on a steering demand for the vehicle;
determining a nominal vehicle steering rate by processing the steering angle with a nominal vehicle predictor to produce the nominal vehicle steering rate, wherein the nominal vehicle predictor is implemented as a transfer function modeling dynamics of a nominal vehicle derived, at least in part, from a selection of vehicles; and
determining a nominal vehicle feedback signal based, at least in part, on a combination of the nominal vehicle steering rate and the yaw rate, wherein the nominal vehicle feedback signal is provided to adjust the steering demand, and wherein the processing the steering angle with the nominal vehicle predictor comprises processing the steering angle, adjusted by the nominal vehicle feedback signal, with the nominal vehicle predictor and receiving the nominal vehicle steering rate from the nominal vehicle predictor.

13. The method of claim 12, wherein the vehicle comprises a watercraft.

14. The method of claim 12, wherein the transfer function comprises a ratio of a nominal vehicle steering rate gain term to a nominal vehicle steering rate lag term.

15. The method of claim 12, wherein the determining the nominal vehicle feedback signal comprises:
determining a difference between the yaw rate and the nominal vehicle steering rate;
integrating the difference; and
applying a feedback gain to the integrated difference to determine the nominal vehicle feedback signal.

16. The method of claim 12, further comprising:
receiving a target heading;
receiving a heading of the vehicle; and
determining the steering demand, wherein the steering demand is based, at least in part, on a difference between the target heading and the heading.

17. The method of claim 16, further comprising:
limiting the steering demand to produce a steering actuator rate demand less than a steering actuator rate limit and/or a steering demand less than a steering actuator angle limit.

18. The method of claim 16, further comprising:
receiving a user-selectable responsiveness setting; and
modifying, based on the responsiveness setting, one or more gains, a deadband, and/or a limit used to determine the steering demand.

19. The method of claim 12, further comprising providing the steering demand to a steering actuator, wherein:
the steering demand is adjusted by the nominal vehicle feedback signal prior to being provided to the steering actuator.

20. The method of claim 12, further comprising providing the nominal vehicle feedback signal to a bandwidth-selectable low-pass filter, wherein:
the filtered nominal vehicle feedback signal is used to adjust the steering demand; and
a bandwidth of the low-pass filter is modified based on a user-selectable responsiveness setting.

21. The method of claim 12, wherein:
the yaw rate is a compensated yaw rate of the vehicle; and
the compensated yaw rate is determined after a pitch, pitch rate, roll, and/or roll rate of the vehicle are determined to reduce a pitch-induced noise in the compensated yaw rate.

22. A non-transitory machine-readable medium comprising a plurality of machine-readable instructions which when executed by one or more logic devices of a system are configured to cause the system to perform a method comprising:
receiving a steering angle and a yaw rate of a vehicle, wherein the steering angle is based, at least in part, on a steering demand;
determining a nominal vehicle steering rate by processing the steering angle with a nominal vehicle predictor to produce the nominal vehicle steering rate, wherein the nominal vehicle predictor is implemented as a transfer function modeling dynamics of a nominal vehicle derived, at least in part, from a selection of vehicles; and
determining a nominal vehicle feedback signal based, at least in part, on a combination of the nominal vehicle steering rate and the yaw rate, wherein the nominal vehicle feedback signal is provided to adjust the steering demand, and wherein the processing the steering angle with the nominal vehicle predictor comprises processing the steering angle, adjusted by the nominal vehicle feedback signal, with the nominal vehicle predictor and receiving the nominal vehicle steering rate from the nominal vehicle predictor.

\* \* \* \* \*